(12) United States Patent
Kim

(10) Patent No.: US 10,836,350 B2
(45) Date of Patent: Nov. 17, 2020

(54) APPARATUS AND METHOD FOR CONTROLLING DOOR UNLOCKING OF AUTOMOBILE

(71) Applicant: SEOYON ELECTRONICS CO., LTD., Suwon-si (KR)

(72) Inventor: Ho Nam Kim, Seoul (KR)

(73) Assignee: SEOYON ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/402,501

(22) Filed: May 3, 2019

(65) Prior Publication Data

US 2019/0351871 A1    Nov. 21, 2019

(30) Foreign Application Priority Data

May 16, 2018    (KR) .......................... 10-2018-0055845

(51) Int. Cl.
  *B60R 25/24*    (2013.01)
  *G07C 9/00*    (2020.01)

(52) U.S. Cl.
  CPC .......... *B60R 25/24* (2013.01); *G07C 9/00309* (2013.01); *G07C 2009/00555* (2013.01)

(58) Field of Classification Search
  CPC ...... G07C 9/00309; G07C 2009/00555; G07C 9/00007; B60R 25/24
  See application file for complete search history.

(56) References Cited

U.S. PATENT DOCUMENTS

| | | | |
|---|---|---|---|
| 6,194,991 B1* | 2/2001 | Barrs ................. | G07C 9/00182 307/10.2 |
| 2005/0134477 A1* | 6/2005 | Ghabra ................. | B60R 25/246 340/13.24 |
| 2007/0024419 A1* | 2/2007 | Nakane ................. | B60R 25/252 340/5.72 |
| 2009/0031767 A1* | 2/2009 | Ko .......................... | B60R 25/24 70/336 |
| 2009/0240845 A1* | 9/2009 | Wiegand ................ | B60K 35/00 710/16 |
| 2016/0039365 A1* | 2/2016 | Vanderwall ......... | B60C 23/0477 701/36 |
| 2017/0372537 A1* | 12/2017 | Zielinski ................ | B60R 25/34 |
| 2018/0089918 A1* | 3/2018 | Murray .................... | G07C 9/20 |

FOREIGN PATENT DOCUMENTS

JP            5508220 B2      5/2014

* cited by examiner

*Primary Examiner* — Thomas D Alunkal
(74) *Attorney, Agent, or Firm* — Birch, Stewart, Kolasch & Birch, LLP

(57) ABSTRACT

Disclosed are an apparatus and a method for controlling unlocking a door of an automobile includes a fob key having a door unlock input unit manipulated by a user and transmitting a door unlock signal, and a controller provided in an automobile and configured to unlock the door of the automobile when a first door unlock signal is received before the preset period of time elapses or when a second door unlock signal is received after the preset period of time elapses, whereby a door of the automobile is not allowed to be unlocked in the case where a hacking tool intercepts the door unlock signal from the fob key and transmits the same to the controller of the automobile after the preset period of time elapses.

4 Claims, 2 Drawing Sheets

APPARATUS AND METHOD FOR CONTROLLING DOOR UNLOCKING OF AUTOMOBILE

CROSS-REFERENCE TO RELATED APPLICATION

This application claims the priority benefit of Korean Patent Application No. 10-2018-0055845, filed on May 16, 2018 in the Korean Intellectual Property Office, the disclosure of which is incorporated herein by reference.

BACKGROUND OF THE INVENTION

1. Field of the Invention

The present invention relates to an apparatus and a method for controlling door unlocking of an automobile, and more particularly to an apparatus and a method for controlling door unlocking of an automobile using a fob key.

2. Description of the Related Art

In general, a fob key/remote controller (Tx) refers to a device capable of performing various functions, such as locking or unlocking an automobile's door, making alerting sound, and stopping, at a predetermined distance from the automobile through wireless communication with the automobile.

For example, the fob key is provided with a door lock button for locking a side door of an automobile and a door unlock button for unlocking a side door of the automobile. If a user pushes the door lock button within a preset distance from the automobile, the side door is locked. If the user pushes the door unlock button within the preset distance, the side door is unlocked.

The above-described conventional fob key transmits to the automobile a signal whose counter increases by 1 whenever the door lock button or the door unlock button is pushed. If a reception controller provided in the automobile receives the signal from the fob key, the reception control lock or unlock the side door.

For example, If the door unlock button provided in the fob key is pushed, the fob key transmits a door unlock signal and the reception controller provided in the automobile unlocks the side door in response to reception of the door unlock signal. Thereafter, if the door unlock button is pushed once again, the fob key transmits a signal whose counter is increased by 1 from the door unlock signal, and the reception controller provided in the automobile unlocks the side door in response to reception of the signal whose counter is increased by 1 from the door unlock signal.

However, the above-described conventional method, which increases a counter of a door unlock signal by 1 each time the door unlock button is pushed, may lead to a possibility where a person with malicious intension can use a hacking tool to intercept and store the door unlock signal transmitted by the fob key to the mobile and to unlock a side door of the automobile when a car owner moves away from the automobile.

The scenario of unlocking a side door of the automobile using a hacking tool may be described as follow.

First, the hacking tool intercepts a door unlock signal that is transmitted from the fob key to the automobile when the door unlock button provided in the fob key is pushed.

If the hacking tool intercepts the door unlock signal, the reception controller provided in the automobile fails to receive the door unlock signal and thus it does not unlock the side door. Consequently, a car owner pushes the door unlock button again while thinking "Why is not the side door unlocked?".

In this manner, the hacking tool intercepts three times a door unlock signal with a counter increased by 1 each time, and transmits the first received door unlock signal to the automobile to unlock the side door of the automobile. As such, even when the side door is unlocked by the hacking tool, the car owner may think the side door is unlocked because he/she pushed the door unlock button of the fob key. Thus, the car owner may unload objects from the automobile without questioning.

As such, after the car owner unloads objects from the automobile and leaves with locking the side door, a malicious person may sequentially transmit a stored door unlock signal with the hacking tool and accordingly the reception controller of the automobile may unlock the side door in response to reception of the door unlock signal from the hacking tool.

SUMMARY OF THE INVENTION

The present invention has been made in view of the above problems, and it is one object of the present invention to provide an apparatus and a method for controlling door unlocking of an automobile, whereby a door of the automobile is not allowed to be unlocked even in the case where an hacking tool intercepts a door unlock signal from a fob key and then transmits the same to a reception controller of the automobile after a preset period of time elapses.

Objects of the present invention should not be limited to the aforementioned objects and other unmentioned objects will be clearly understood by those skilled in the art from the following description.

In accordance with an embodiment of the present invention, the above and other objects can be accomplished by the provision of an apparatus for controlling door unlocking of an automobile, the apparatus including: a fob key having a door unlock input unit manipulated by a user and configured to transmit a first door unlock signal when a door unlock intent is input for a first time in response to manipulation of the door unlock input unit, and transmit the second door unlock signal when the door unlock intent is input again through the door unlock input unit after a preset period of time has elapsed since the inputting of the door unlock intent for the first time; and a reception controller provided in an automobile and configured to unlock a door of the automobile when the first door lock signal is received before the preset period of time elapses or when the second door unlock signal is received after the preset period of time elapses.

The preset period of time may include a first preset period of time and a second period of time temporally following the first preset period of time and having a same duration as a duration of the first period of time; the first door unlock signal may be a signal transmitted when the door unlock input unit may be manipulated within the first preset period of time, and the second door unlock signal may be a signal transmitted when the door unlock input unit is manipulated within the second preset period of time; and the reception controller may be further configured to unlock the door of the automobile when the first door unlock signal is received within the first preset period of time or when the second door unlock signal is received within the second preset period of time.

The second door unlock signal may be a signal with a counter increased by 1 from the first door unlock signal, and the fob key may be further configured to increase the counter of the first door unlock signal by 1 when the door unlock signal is input again whenever the first preset period of time has elapsed since the inputting of the door unlock intent for the first time.

The fob key may be further configured to: transmit the first door unlock signal even when a number of manipulation of the door unlock input unit increases within the first preset period of time, and transmit the second door unlock signal even when a number of manipulation of the door unlock input unit within the second preset period of time.

The first door unlock signal and the second door unlock signal may be Radio Frequency (RF) signals.

In addition, the present invention provides a method for controlling door unlocking of an automobile, the method including: by a fob key having a door unlock input unit manipulated by a user, transmitting a first door unlock signal when a door unlock intent is input for a first time in response to manipulation of the door unlock input unit, and transmitting the second door unlock signal when the door unlock intent is input again through the door unlock input unit after a preset period of time has elapsed since the inputting of the door unlock intent for the first time; and by a reception controller provided in an automobile, unlocking a door of the automobile when the first door lock signal is received before the preset period of time elapses or when the second door unlock signal is received after the preset period of time elapses.

The details of other embodiments are included in the following description and the accompanying drawings.

The apparatus and the method for controlling door unlocking of an automobile according to the present invention have effects in that a fob key transmits a first door unlock signal for a preset period of time and transmits a second door unlock signal, different from the first door unlock signal, after the preset period of time elapses and that a reception controller provided in the automobile unlocks a door of the automobile when the first door unlock signal is received before the preset period of time elapses or when the second door unlock signal is received after the preset period of time elapses, and accordingly, the door of the automobile is not allowed to be unlocked even in the case where a hacking tool intercepts the first door unlock signal and transmits the same to the reception controller after the preset period of time elapses.

Effects of the present invention are not limited to the effects described above, and other effects not mentioned herein may be understood to those skilled in the art from the description below.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
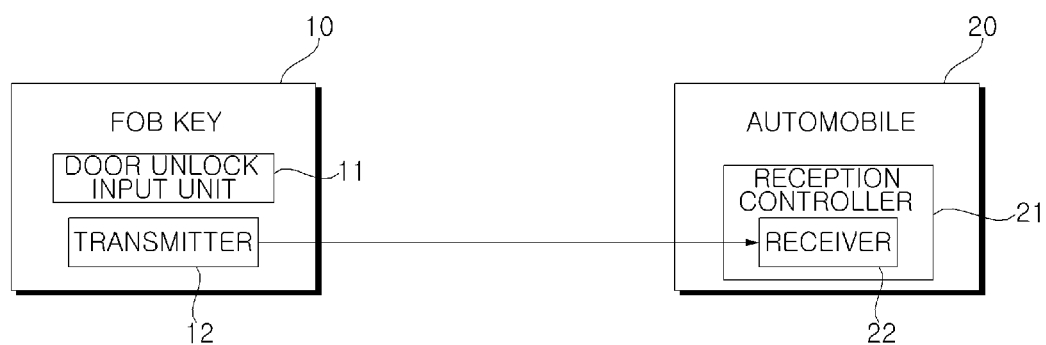
FIG. 1 is a control block diagram showing an apparatus for controlling door unlocking of an automobile according to an embodiment of the present invention.

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. In the drawings, the thickness of layers and regions may be exaggerated for clarity. Throughout the drawings, like numbers refer to like elements.

Hereinafter, an apparatus and a method for controlling door unlocking of an automobile according to an embodiment of the present invention will be described with reference to the accompanying drawings.

FIG. 1 is a control block diagram showing an apparatus for controlling door unlocking of an automobile according to an embodiment of the present invention.

An apparatus for controlling door unlocking of an automobile according to the present invention may include a fob key 10 and a reception controller 21.

The fob key 10 may be carried by a user. The fob key may include a door unlock input unit 11 that is manipulated by the user. The door unlock input unit 11 may be provided as a push button or a touch pad according to how the door unlock input unit 11 is manipulated by the user. In response to manipulation of the door unlock input unit 11 by the user, a door locking intent may be input. In the case where the door unlock input unit 11 is provided as the push button, a door unlock intent may be input in response to pushing the push button by the user. In addition, in the case where the door unlock input unit 11 is provided as the touch pad, the intension of unlocking the door may be input in response to touching the touch pad by the user.

When a door unlock intent is input for the first time in response to manipulation of the door unlock input unit 11, the fob key 10 may transmit a first door unlock signal to the reception controller 21 provided in an automobile 20. Then, when the door unlock intent is input again through the door unlock input unit 11 after a preset period of time has elapsed since the inputting of the door unlock intent for the first time, the fob key 10 may transmit a second door unlock signal to the reception controller 21.

The fob key 10 may include a transmitter 12 that transmits the first door unlock signal and the second door unlock signal to the reception controller 21. In addition, the reception controller 21 may include a receiver 22 that receives the first door unlock signal and the second door unlock signal, which are transmitted by the transmitter 12.

When the first door unlock signal is received before the preset period of time elapses or when the second door unlock signal is received after the preset period of time elapses, the reception controller 21 may unlock a door of the automobile.

The preset period of time may include a first preset period of time, and a second preset period of time temporally following the first preset period of time and having the same duration as that of the first preset period of time.

The first door unlock signal may be a signal that is transmitted when the door unlock input unit 11 is manipulated within the first preset period of time, and the second door unlock signal may be a signal that is transmitted when the door unlock input unit 11 is manipulated within the second preset period of time.

When the first door unlock signal is received within the first preset period of time or when the second door unlock signal is received within the second preset period of time, the reception controller 21 may unlock a door of the automobile.

The second door unlock signal may be a signal with a counter increased by 1 from the first door unlock signal.

When the door unlock intent is input again every time the preset period of time elapses since the inputting of the door unlock intent for the first time, the fob key 10 may increase the counter of the first door unlock signal by 1 each time. For example, suppose that the preset period of time is 10 seconds. In this case, when a door unlock intent is input again every 10 seconds after the door unlock intent is input for the first time in response to manipulation of the door unlock input unit 11 by a user, the fob key 10 may transmit a second door unlock signal that is a signal with a counter increased by 1 from the first door unlock signal. That is, when the door unlock intent is input for the first time, the fob key 10 may transmit the first door unlock signal; when the door unlock intent is input again after a preset period of time has elapsed, the fob key 10 may transmit the second door unlock signal that is a signal with a counter increased by 1 from the first door unlock signal; and, when the door unlock intent is input once again after the preset period of time has elapsed again, the fob key 10 may transmit a third door unlock signal that is a signal with a counter increased by 2 from the first door unlock signal. The maximum value of the counter may be limited to any of various values, for example, to 100, 1000, or the like. Hereinafter, for convenience of explanation, it is limited that the counter is increased by 1 each time, and the second door unlock signal is described as a signal with a counter increased by 1 from the first door unlock signal.

The fob key 10 may transmit the first door unlock signal even when the number of times to manipulate the door unlock input unit 11 increases within the first preset period of time, and transmit the second door unlock signal even when the number of times to manipulate the door unlock input unit 11 increases within the second preset period of time. That is, even in the case where the door unlock intent is input multiple times as the door unlock input unit 11 is manipulated multiple times within 10 seconds, the fob key 10 does not increase a counter. If the door unlock intent is input again as the door unlock input unit 11 is manipulated after the 10 seconds has elapsed, the fob key 10 may increase the counter by 1. Then, after increasing the counter by 1, the fob key 10 may not increase the counter even when the door unlock intent is input multiple times as the door unlocking input unit 11 is manipulated multiple times within 10 seconds.

Meanwhile, the first door unlock signal and the second door unlock signal may be Radio Frequency (RF) signals.

Figure 2:
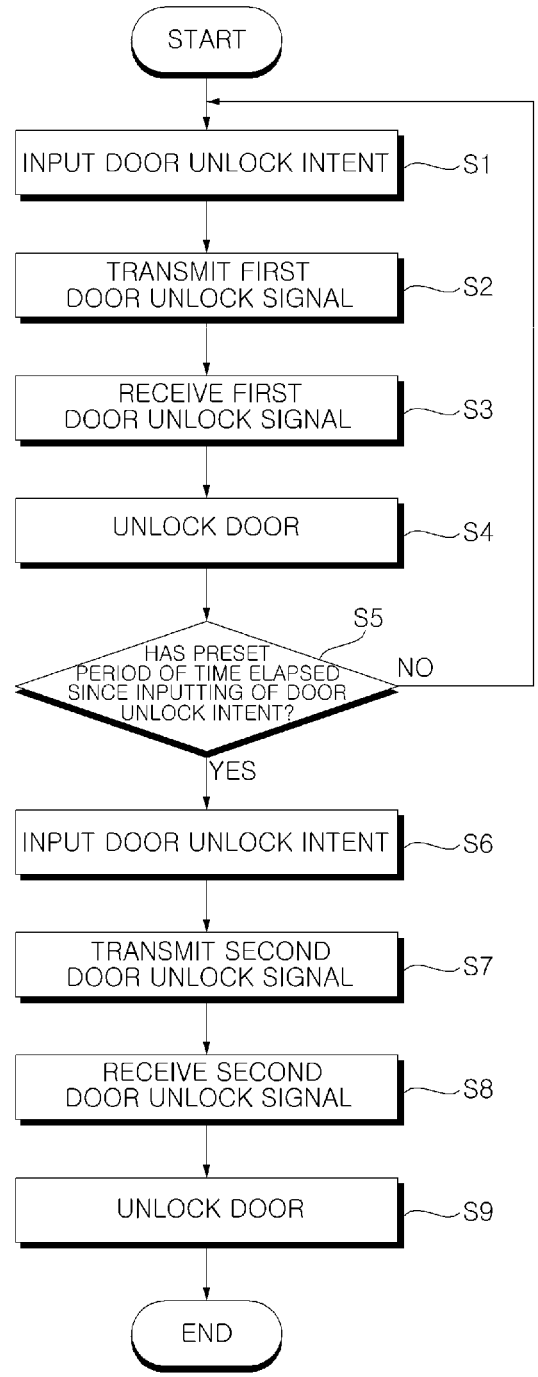
FIG. 2 is a flowchart showing a method for controlling door unlocking of an automobile according to an embodiment of the present invention.

FIG. 2 is a flowchart of a method for controlling door unlocking of an automobile according to an embodiment of the present invention. Here, the method will be described in conjunction with the aforementioned apparatus for controlling door unlocking of an automobile according to an embodiment of the present invention.

In the method for controlling door unlocking of an automobile according to an embodiment of the present invention, as the door unlock input unit 11 provided in the fob key 10 is manipulated by a user, a door unlock intent is input for the first time (S1).

Then, the fob key 10 transmits a first door unlock signal to the reception controller 21 (S2).

The reception controller 21 receives the first door unlock signal from the fob key 10 (S3).

Thereafter, when the first door unlock signal is received from the fob key 10, the reception controller 21 unlocks a door of an automobile (S4).

Thereafter, the fob key 10 determines whether a preset period of time has elapsed since the inputting of the door unlock intent for the first time (S5).

If it is determined in S5 that the preset period of time has not yet elapsed since the inputting of the door unlock intent for the first time, steps S1 to S4 are performed repeatedly. That is, even in the case where a user continues inputting the door unlock intent by manipulating the door unlock input unit 11 multiple times, the fob key 10 may transmit the first door unlock signal whose counter is not increased, and the reception controller 21 may unlock the door in response to reception of the first door unlock signal.

In addition, if it is determined in S5 that the preset period of time has elapsed since the inputting of the door unlock intent for the first time, the door unlock intent is input again through the door unlock input unit 11 (S6).

Then, the fob key 10 transmits a second door unlock signal, whose counter is increased by 1 from the first door unlock signal, to the reception controller 21 (S7).

The reception controller 21 receives the second door unlock signal from the fob key 10 (S8).

Then, the reception controller 21 unlocks a door of the automobile in response to reception of the second door unlock signal from the fob key 10 (S9).

When the first door unlock signal is received before the preset period of time elapses or when the second door unlock signal is received after the preset period of time elapses, the reception controller 21 unlocks a door of the automobile.

As such, according to the apparatus and method for controlling door unlocking of an automobile according to the present invention, the fob key 10 transmits a first door unlock signal during a preset period of time and transmits a second door unlock signal different from the first door unlock signal after the preset period of time has elapsed. When the first door unlock signal is received before the preset period of time elapses or when the second door unlock signal is received after the preset period of time elapses, the reception controller 21 provided in the automobile unlocks a door of the automobile. Thus, even in the case where a hacking tool intercepts the first door unlock signal and transmits the same to the reception controller 21 after the preset period of time has elapsed, the door of the automobile remains locked.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. An apparatus for controlling door unlocking of an automobile, the apparatus comprising:
   a fob key having a door unlock input unit manipulated by a user and configured to transmit a first door unlock signal when a door unlock intent is input for a first time in response to manipulation of the door unlock input unit, and transmit a second door unlock signal when the door unlock intent is input again through the door unlock input unit after a preset period of time has elapsed since the inputting of the door unlock intent for the first time; and a reception controller provided in an automobile and configured to unlock a door of the automobile when the first door lock signal is received before the preset period of time elapses or when the second door unlock signal is received after the preset period of time elapses, wherein the preset period of time comprises a first preset period of time and a second period of time temporally following the first preset period of time and having a same duration as a duration of the first period of time, wherein the first door unlock signal is a signal transmitted when the door unlock input unit is manipulated within the first preset period of time, and the second door unlock signal is a signal transmitted when the door unlock input unit is manipulated within the second preset period of time, wherein the reception controller is further configured to unlock the door of the automobile when the first door unlock signal is received within the first preset period of time or when the second door unlock signal is received within the second preset period of time, wherein the second door unlock signal is a signal with a counter increased by 1 from the first door unlock signal, wherein the fob key is further configured to increase the counter of the first door unlock signal by 1 when the door unlock signal is input again whenever the first preset period of time has elapsed since the inputting of the door unlock intent for the first time, and wherein the fob key is further configured to:
transmit the first door unlock signal even when a number of manipulation of the door unlock input unit increases within the first preset period of time, and
transmit the second door unlock signal even when a number of manipulation of the door unlock input unit increases within the second preset period of time.

2. The apparatus of claim 1, wherein the first door unlock signal and the second door unlock signal are Radio Frequency (RF) signals.

3. A method for controlling door unlocking of an automobile, the method comprising:
by a fob key having a door unlock input unit manipulated by a user, transmitting a first door unlock signal when a door unlock intent is input for a first time in response to manipulation of the door unlock input unit, and transmitting a second door unlock signal when the door unlock intent is input again through the door unlock input unit after a preset period of time has elapsed since the inputting of the door unlock intent for the first time; and by a reception controller provided in an automobile, unlocking a door of the automobile when the first door lock signal is received before the preset period of time elapses or when the second door unlock signal is received after the preset period of time elapses, wherein the preset period of time comprises a first preset period of time and a second period of time temporally following the first preset period of time and having a same duration as a duration of the first period of time, wherein the first door unlock signal is a signal transmitted when the door unlock input unit is manipulated within the first preset period of time, and the second door unlock signal is a signal transmitted when the door unlock input unit is manipulated within the second preset period of time, wherein the reception controller is further configured to unlock the door of the automobile when the first door unlock signal is received within the first preset period of time or when the second door unlock signal is received within the second preset period of time, wherein the second door unlock signal is a signal with a counter increased by 1 from the first door unlock signal, wherein the fob key is further configured to increase the counter of the first door unlock signal by 1 when the door unlock signal is input again whenever the first preset period of time has elapsed since the inputting of the door unlock intent for the first time, and wherein the fob key is further configured to:
transmit the first door unlock signal even when a number of manipulation of the door unlock input unit increases within the first preset period of time, and
transmit the second door unlock signal even when a number of manipulation of the door unlock input unit increases within the second preset period of time.

4. The method of claim 3, wherein the first door unlock signal and the second door unlock signal are Radio Frequency (RF) signals.

* * * * *